United States Patent [19]

Imahori et al.

[11] 4,313,731
[45] Feb. 2, 1982

[54] MONO-AZO COMPOUND, MONO-AZO DYE AND DYEING PROCESS FOR POLYESTER FIBERS

[75] Inventors: Seiichi Imahori, Kawasaki; Kiyoshi Himeno, Yokohama; Maeda, Shuichi, Saitama, all of Japan

[73] Assignee: Mitsubishi Chemical Industries Limited, Tokyo, Japan

[21] Appl. No.: 186,372

[22] Filed: Sep. 12, 1980

[51] Int. Cl.$^3$ .................. D06P 5/12; C09B 12/36
[52] U.S. Cl. .................................... 8/451; 8/456; 8/464; 8/466; 8/692; 8/922; 260/154; 260/157
[58] Field of Search .................. 8/692, 451, 464, 466; 260/157, 154

[56] References Cited
U.S. PATENT DOCUMENTS 4,097,475  6/1978  James .............................. 260/157

FOREIGN PATENT DOCUMENTS 52-70184  6/1977  Japan .

*Primary Examiner*—A. Lionel Clingman
*Attorney, Agent, or Firm*—Bierman & Bierman

[57] ABSTRACT

Mono-azo compounds and mono-azo dyes represented by the following general formula and a dyeing process for polyester fibers using the mono-azo dyes:

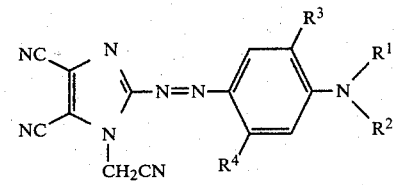

wherein $R^1$ and $R^2$ individually represent hydrogen atom, substituted or non-substituted alkyl group, alkenyl group and cyclohexyl group, $R^3$ represents hydrogen atom, chlorine atom, bromine atom, alkyl group, substituted or non-substituted alkoxy group or alkenyl group and $R^4$ represents hydrogen atom, chlorine atom, bromine atom, alkyl group, alkoxy group, hydroxy group, acylamino group, alkoxycarbonylamino group, aralkyloxycarbonylamino group or alkylaminocarbonylamino group.

3 Claims, No Drawings

MONO-AZO COMPOUND, MONO-AZO DYE AND DYEING PROCESS FOR POLYESTER FIBERS

BACKGROUND OF THE INVENTION

1. Field of the Invention

This invention concerns novel mono-azo compounds, particularly, mono-azo compounds useful as dyes. It further relates to a process for dyeing polyester fibers using such novel mono-azo dyes.

The mono-azo compounds according to this invention are useful as dyes and, when employed as dyes, they have good temperature-dependency. When the dyes according to this invention are used for dyeing polyester fiber fabrics, the dyed fabrics thus obtained show less stains in white ground printing and have satisfactory color fastnesses such as color fastness to sublimation.

Further, when polyester fibers are applied with resistive or discharge printing using the mono-azo compound according to this invention as a dye and using a base as a resistive or discharge printing agent, various clear and fast printed designs with less damages to the fibers and with excellent whiteness in the resistive or discharge dye printed areas can be obtained.

2. Description of the Prior Art

It is known that polyester fibers can be dyed yellow or blue by azo dyes represented by the following general formula:

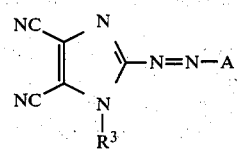

wherein $R^3$ is alkyl group, substituted alkyl group or aralkyl group; and A is the residue of a coupling component selected from the group consisting of:
(1) 5- or 6-membered heterocyclic compounds having amino group, oxo group or hydroxy group,
(2) substituted or non-substituted naphthols, and
(3) aromatic amines having no 4-substituent group relative to the amino group and at least one aliphatic or cycloaliphatic substituent coupled to the nitrogen atom in the amino group (refer to Japanese Patent Publication No. 17848/1977).

SUMMARY OF THE INVENTION

The mono-azo compounds and the mono-azo dyes according to this invention are represented by the following general formula (I):

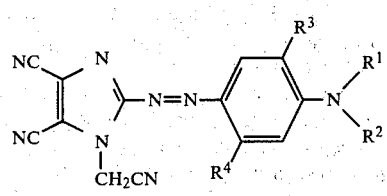

wherein $R^1$ and $R^2$ individually represent hydrogen atom, substituted or non-substituted alkyl group, alkenyl group and cyclohexyl group; $R^3$ represents hydrogen atom, chlorine atom, bromine atom, alkyl group, substituted or non-substituted alkoxy group or alkenyl group and $R^4$ represents hydrogen atom, chlorine atom, bromine atom, alkyl group, alkoxy group, hydroxy group, acylamino group, alkoxycarbonylamino group, aralkyloxycarbonylamino group or alkylaminocarbonylamino group.

DETAILED DESCRIPTION OF THE PREFERRED EMBODIMENTS

In the general formula (I) referred to above, $R^1$ and $R^2$ include individually hydrogen atom; alkyl group such as methyl group, ethyl group, straight or branched propyl group, butyl group, pentyl group, hexyl group, heptyl group, octyl group; lower alkoxyalkyl group such as methoxyethyl group, ethoxyethyl group and butoxyethyl group; alkenyloxy lower alkyl group such as allyloxyethyl group; lower alkoxyalkoxyalkyl group such as methoxyethoxyethyl group and ethoxyethoxyethyl group; lower alkoxyalkoxyalkoxyalkyl group such as methoxyethoxyethoxyethyl group and ethoxyethoxyethoxyethyl group; phenoxyalkyl group which may be substituted such as phenoxyethyl group and chlorophenoxyethyl group; aralkyloxyalkyl group which may be substituted such as benzyloxyethyl group and chlorobenzyloxyethyl group; cyano lower alkyl group such as cyanomethyl group and cyanoethyl group; hydroxyalkyl group which may be substituted such as hydroxyethyl group, hydroxypropyl group, hydroxybutyl group, hydroxyhexyl group and 2-hydroxy-3-methoxypropyl group; acyloxy lower alkyl group which may be substituted such as acetyloxyethyl group, chloroacetyloxyethyl group, chloropropionyloxyethyl group and benzoyloxyethyl group; alkoxycarbonyloxy lower alkyl group such as methoxycarbonyloxyethyl group and methoxyethoxycarbonyloxyethyl group; carbamoyl lower alkyl group such as carbamoylmethyl group and carbamoylethyl group; alkoxycarbonyl lower alkyl group which may substituted such as methoxycarbonylmethyl group, ethoxycarbonylmethyl group, methoxyethoxycarbonylmethyl group, ethoxycarbonylethyl group and benzyloxycarbonylmethyl group; aralkyl group which may be substituted such as benzyl group, phenetyl group, chlorobenzyl group and nitrobenzyl group; aryloxycarbonyl lower alkyl group such as aryloxycarbonylethyl group and aryloxycarbonylmethyl group; tetrahydrofurfuryl group; succinimide lower alkyl group such as succinimideethyl group, phthalimide lower alkyl group such as phthalimideethyl group; cyanoalkoxy lower alkyl group such as cyanoethoxyethyl group and cyanomethoxy ethyl group; halogeno alkyl group such as chloroethyl group; alkenyl group such as allyl group, methallyl group and crotyl group; and cyclohexyl group.

Preferred $R^1$ and $R^2$ include alkyl group having 1–8 carbon atom number, lower alkoxy alkyl group, lower alkoxyalkoxyalkyl group, tetrahydrofurfuryl group, acyloxy lower alkyl group and aralkyl group.

$R^3$ includes hydrogen atom; chlorine atom; bromine atom; alkyl group such as methyl group, ethyl group, straight or branched propyl group, butyl group, pentyl group, hexyl group, heptyl group and octyl group; alkoxy group such as methoxy group and ethoxy group; lower alkoxyalkoxy group such as methoxyethoxy group and ethoxyethoxy group; lower alkoxyalkoxyalkoxy group such as methoxyethoxyethoxy group and ethoxyethoxyethoxy group; halogeno lower alkoxy group such as chloroethoxy group and bromoethoxy group; cyano lower alkoxy group such as cyanoethoxy group; and alkenyl group such as allyl group, methallyl group and crotyl group.

Preferred $R^3$ includes hydrogen atom and alkoxy group.

$R^4$ includes hydrogen atom; chlorine atom; bromine atom; alkyl group such as methyl group, ethyl group, straight or branched propyl group, butyl group, pentyl group, hexyl group, heptyl group and octyl group; alkoxy group such as methoxy group and ethoxy group; hydroxy group; acylamino group which may be substituted such as acetylamino group, chloroacetylamino group, bromoacetylamino group, benzoylamino group, methoxybenzoylamino group, methylsulfonylamino group, benzenesulfonylamino group and bromopropionylamino group; alkoxycarbonylamino group such as methoxycarbonylamino group, ethoxycarbonylamino group and methoxyethoxycarbonylamino group; aralkyloxycarbonylamino group such as benzyloxycarbonylamino group; and alkylaminocarbonylamino group such as ethylaminocarbonylamino group.

Preferred $R^4$ includes hydrogen atom, alkyl group and acylamino group.

The mono-azo compounds and mono-azo dyes shown by the general formula (I) mentioned above are produced by reacting the compounds represented by the general formula (II)

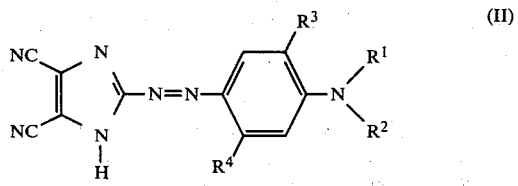

wherein $R^1$, $R^2$, $R^3$ and $R^4$ have the same meanings as defined above, with the compound represented by the general formula (III)

X—CH$_2$CN         (III)

wherein X represents halogen atom, or with the compound represented by the general formula (IV)

D—SO$_3$CH$_2$CN        (IV)

wherein D represents phenyl group which may be substituted.

Sulfonic acid esters represented by the general formula (IV) which are one of the starting materials for the mono-azo compounds and the mono-azo dyes according to this invention specifically include cyanomethyl p-toluenesulfonate and cyanomethylphenylsulfonate.

Further, the halogenated compounds represented by the general formula (III) specifically include chloroacetonitrile, bromoacetonitrile, iodoacetonitrile and the like.

The compounds represented by the general formula (II) are obtained by diazotizing 2-amino-4,5-dicyanoimidazole in a conventional manner and coupling the diazotized products with the amines represented by the following general formula (V):

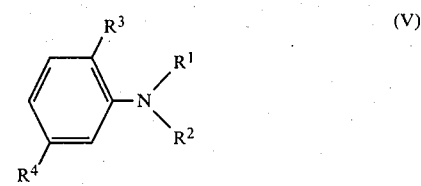

wherein $R^1$, $R^2$, $R^3$ and $R^4$ have the same meanings as defined above.

The mono-azo compounds and the mono-azo dyes according to this invention can be obtained at high purity and good yield by heating, at 20°–200° C., the compound represented by the general formula (II) with the halogenated compound represented by the general formula (III) or sulfonic acid ester represented by the formula (IV) in an aromatic solvent such as chlorobenzene, dichlorobenzene, trichlorobenzene, nitrobenzene, ortho-nitrotoluene, an inert solvent, e.g., N-alkyl formamides such as dimethylformamide, N-alkyl pyrrolidones such as N-methylpyrrolidone, ketones such as acetone and methylethyl ketone, alcohols such as methanol, nitriles such as acetonitrile, or in a water-organic solvent system such as water-acetone, water-acetonitrile, water-methylethyl ketone, water-tetrahydrofuran and water-N-methylpyrrolidone, at the presence of an organic or inorganic base such as pyridine, piperidine, sodium carbonate, potassium carbonate, magnesium oxide, sodium hydroxide and sodium hydrogen carbonate.

Fibers which can be dyed with the mono-azo dyes according to this invention include polyester fibers comprising polyethyleneterephthalate, poly-condensation products of terephthalic acid and 1,4-bis-(hydroxymethyl) cyclohexane and the like or blended yarn products or blended fabrics of natural fibers such as cotton, silk and wool with the polyester fibers mentioned above.

In dyeing the polyester fibers using the dyes according to this invention, since the dyes represented by the foregoing general formula (I) are insoluble or less soluble to water, dyeing or printing may be conducted using a dyeing bath or a printing paste prepared by dispersing those dyes in an aqueous medium using condensation products of naphthalene sulfonic acid with formaldehyde, higher alcohol sulfates, higher alkylbenzene sulfonates and the likes, as a dispersing agent, in a conventional manner. In the case of dyeing, polyester fibers or their blended yarn products can be dyed, for example, with excellent color fastness by the application of usual dyeing process such as high temperature dyeing, carrier dyeing and thermo-sol dyeing. In this case, better results can be obtained by adding acidic substances such as formic acid, acetic acid, phosphoric acid or ammonium sulfate to the dyeing bath.

The dyes represented by the foregoing general formula (I) for use with the process according to this invention may be used in combination with dyes of similar or different types, in which satisfactory results such as improvement in the dyeability may be obtained by compounding the dyes represented by the foregoing general formula (I) to each other.

Further, when polyester fibers are applied with resistive or discharge printing using, as a dye, the mono-azo dyes according to this invention and using, as a resistive or discharge printing agent, at least one base selected from hydroxides of alkali metals and alkaline earth metal, salts of organic and inorganic weak acids, ammonia and aliphatic amines, various clear and fast printed designs can be obtained with less damages to the fibers and satisfactory whiteness in the resistive or discharge printed areas.

The organic or inorganic bases for use as the resistive or discharge printing agent in resistive or discharge printing pastes include alkali metal hydroxide such as sodium hydroxide, potassium hydroxide and lithium hydroxide; alkaline earth metal hydroxide such as calcium hydroxide; alkali metal phosphate such as disodium hydrogen phosphate, sodium dihydrogen phosphate, trisodium phosphate and potassium hydrogen phosphate; alkali metal carbonate such as potassium carbonate, sodium carbonate and lithium carbonate; alkali metal bicarbonate such as sodium bicarbonate and potassium bicarbonate; alkali metal trialkylphosphate such as sodium trimethylphosphate and potassium triethylphosphate; alkali metal borate such as sodium borate and potassium borate; ammonia; and aliphatic amines such as triethylamine, tripropylamine, tributylamine, ethanol amine, dimethylethanol amine, diethylethanol amine, diethanol amine, methyldiethanol amine, ethyldiethanol amine, propyldiethanol amine and triethanol amine.

Various processes have been known for the resistive or discharge-printing of polyester fibers. Among them, a first method is conducted by padding polyester fiber fabrics with a dispersion containing the mono-azo dye represented by the foregoing general formula (I) and various auxiliary agents, drying them at a temperature from 80° C. to 150° C., printing the thus obtained dyed fabrics with a discharge printing paste containing the base mentioned above and various auxiliary agents, successively applying heat treatment at a temperature between 100° C. and 230° C. to decompose the mono-azo dye represented by the general formula (I) mentioned above at the area in which fixing and discharge printing paste was printed and, thereafter, applying after-treatment in a conventional manner. A second method is conducted by at first, printing polyester fiber fabrics with a resistive printing paste, successively printing them after drying at a temperature from 80° C. to 150° C. or directly as they are with a printing paste containing the mono-azo dye represented by the foregoing general formula (I) and various auxiliary agents, then applying heat treatment at a temperature from 100° C. to 230° C. to decompose the mono-azo dye represented by the general formula (I) at the area in which fixing and resistive printing paste was printed and, thereafter, applying after-treatment in a conventional manner. A third method include such one of at first printing the polyester fiber fabrics with a printing paste containing the mono-azo dye represented by the general formula (I) mentioned above, drying them at a temperature from 80° C. to 150° C., then printing them with a discharge printing paste, successively applying heat treatment at a temperature from 100° C. to 230° C. to decompose the mono-azo dye represented by the general formula (I) at the area in which fixing and discharge printing paste is printed and, thereafter, applying after-treatment in a conventional manner.

In the application of various resistive or discharge-printing processes as described above to the polyester fiber fabrics, multi-color designes can be formed by adding alkali-resistant dyes as set forth below to the resistive or discharge printing paste.

The alkali-resistant disperse dyes that can be combined with the dyes represented by the above general formula (I) for forming multi-color designes are known dyes consisting of the group of azo, azomethine, quinophthalone, nitro and anthraquinone dyes. Several of the examples for the alkali-resistant disperse dyes are specifically shown below:

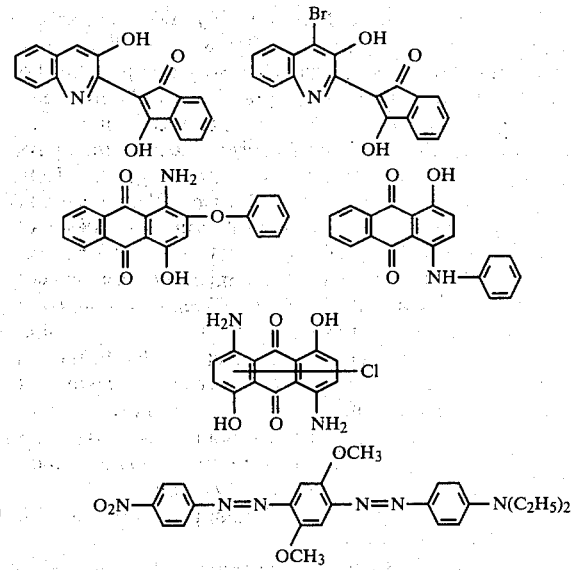

This invention is to be described by way of preferred embodiments further in details but this invention is no way limited to such embodiments.

In Examples and Comparative Examples, polyester fiber fabrics were printed with printing pastes containing mono-azo dyes according to this invention and various auxiliary agents and dried and then with alkali-containing resistive or discharge printing pastes, applied with heat treatment at a temperature from 100° C. to 230° C. to develop and fix the colors of the dyes and, thereafter, subjected to after-treatments in conventional manner. Then, the resistive or discharge performance of the alkali was judged with regard to the whiteness at the areas applied with the resistive or discharge printing by way of a grey scale (in 5-step indication).

The temperature-dependency was indicated by the digitalized dyeing density at a temperature of 120° C. with a reference dyeing density at a temperature of 130° C. as 100. The dyeing temperature is usually 130° C. and the dyeing density decreases as the temperature lowers.

The color fastness to sublimation was judged according to Japanese Industrial Standards JIS 0879-B (1975) by putting test specimens of about 10 cm×4 cm in size (printed cloth of finished yarn fabric) between tetron tuftas, drying them with an iron tester (180° C.×30 sec) and using a grey scale (in 5-step indication).

EXAMPLE 1

30 g of the dye represented by the following structural formula:

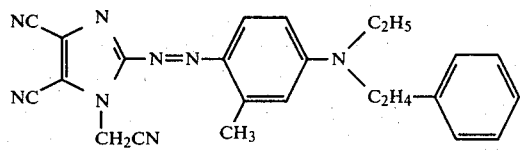

were finely dispersed and a padding liquid containing 945 ml of water, 20 g of an aqueous 10% FINEGUM LV3 solution (manufactured by Daiichi Kogyo Seiyaku) and 5 g of citric acid was added to them. Polyester fiber fabrics were padded using this padding liquid, squeezed to a 60% absorption rate of dyeing liquid and then dried at 80°–100° C. After the drying, overprinting was applied using a discharge printing paste containing 50 g of sodium carbonate, 50 g of COLOR FINE AD (manufactured by Daiichi Kogyo Seiyaku Co.), 600 g of an aqueous 25% solution of TEXPRINT LB (manufactured by Grünau Co.) and 300 ml of water. After applying fixing and reducing after-treatment with superheated steams at 175° C. for 7 minutes, soap treatment and successive linsing and drying, clear and blue-tinted red printing having satisfactory color fastnesses, in particular, excellent color fastnesses to light, sublimation, water and washing was obtained. Very satisfactory white ground printing with distinct contours were obtained at the areas where the sodium carbonate-containing discharge printing paste had been printed.

The dye employed in this Example was prepared in the manner shown below.

A mixture of 38.3 g of the compound represented by the following formula:

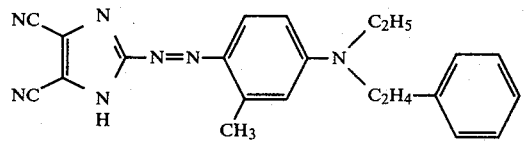

8.0 g of sodium hydrogen carbonate, 80 ml of methylethylketone and 320 ml of water was agitated at room temperature for 30 minutes. 16.0 g of chloroacetonitrile were added, gradually heated and further agitated at 72° C. for 20 hours. Then, after cooling to room temperature, 400 ml of methanol were added, agitated at room temperature for 2 hours and then deposited crystals were collected through filtration. Upon washing and drying, 35.4 g of dark red crystals of the dye represented by the following formula:

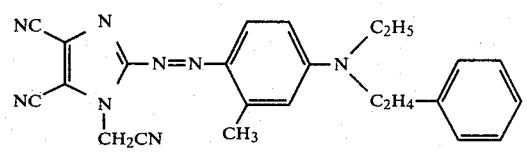

were obtained. This dye showed λ max at 530 nm (in acetone). The elementary analytical values for the dye well conformed with the calculated values as shown in the following table.

| [$C_{24}H_{22}N_8$] | C (%) | H (%) | N (%) |
|---|---|---|---|
| Calculated value | 68.23 | 5.25 | 26.53 |
| Analytical value | 68.31 | 5.19 | 26.44 |

COMPARATIVE EXAMPLES 1-1 TO 1-4:

Polyester fibers were dyed in the same manner as in Example 1 excepting the use of dyes having the structural formulas shown in Table 1 to obtain dyed fabrics with clear blue-tinted red color. Table 1 shows the results of evaluation for these dyes as well as that for the dye in Example 1.

TABLE 1

| | Structural formula for dye | Whiteness, alkali discharge printing | Temperature dependency | Color fastness to sublimation |
|---|---|---|---|---|
| Example 1 | NC-C(=N-CH₂CN)-N=N-C₆H₃(CH₃)-N(C₂H₅)(C₂H₄-C₆H₅), NC- | 5 | 80 | 4–5 |
| Comparative Example 1-1 | NC-C(=N-CH₂CH₂CN)-N=N-C₆H₃(CH₃)-N(C₂H₅)(C₂H₄-C₆H₅), NC- | 3 | 45 | 4 |
| Comparative Example 1-2 | NC-C(=N-CH₂CH(OH)C₂H₅)-N=N-C₆H₃(CH₃)-N(C₂H₅)(C₂H₄-C₆H₅), NC- | 2–3 | 40 | 4 |

TABLE 1-continued

| | Structural formula for dye | Whiteness, alkali discharge printing | Temperature dependency | Color fastness to sublimation |
|---|---|---|---|---|
| Comparative Example 1-3 | | 1 | 60 | 3-4 |
| Comparative Example 1-4 | | 1 | 20 | 4-5 |

EXAMPLE 2

Polyester fiber fabrics were printed using a resistive printing paste containing 60 g of sodium carbonate, 60 g of COLOR FINE AD (manufactured by Daiichi Kogyo Seiyaku Co.), 600 g of an aqueous 25% solution of TEXPRINT LB (manufactured by Grünau Co.) and 280 ml of water and dried at 80°-100° C. After drying, they were over printed using a printing paste prepared by finely dispersing 30 g of the dye represented by the following structural formula:

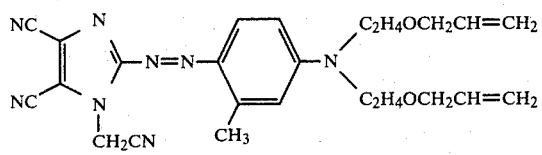

and adding thereto 24 g of CELLUCOL PBL-600 (manufactured by Adachi Koryo Co.), 45.5 g of KI-PROGUM P-20N (manufactured by Nichiden Kagaku Co.), 1.5 g of tartaric acid, 10.2 g of MS POWDER (manufactured by Meisei Kagaku Co.), 30 g of MEI-PRINTER Y-75 (manufactured by Meisei Kagaku Co.) and 858.8 ml of water. After applying fixing and reducing after-treatment with superheated steams at 175° C. for 6 min., soap treatment and successive linsing and drying, clear red printing having very satisfactory color fastnesses, in particular, excellent color fastnesses to light, sublimation, water and washing was obtained. Very satisfactory white ground printing with distinct contours was obtained at the areas where the resistive printing paste containing sodium carbonate had been printed.

The dye used in this Example was prepared as below.

A mixture of 41.9 g of the compound represented by the following formula:

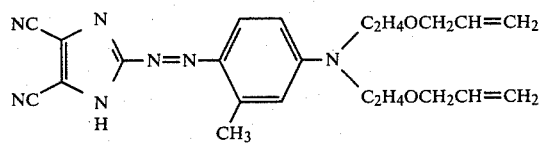

8.0 g of chloroacetonitrile and 200 ml of N-methylpyrrolidone was heated to 80° C. and, after three hours, 8.4 g of sodium hydrogen carbonate were gradually added over 8 hours. Thereafter, agitation was conducted for 10 hours, 3.0 g of chloroacetonitrile were added and agitation was conducted for further 8 hours. Then, after cooling to room temperature, they were poured into 1 l of water and deposited crystals were collected through filtration. They were washed and dried to obtain 38.5 g of dark red crystals of the dye represented by the following general formula:

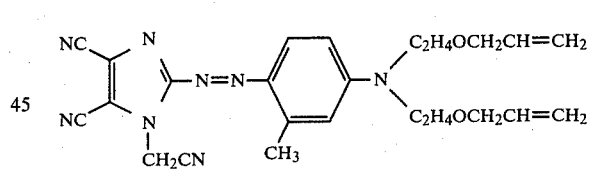

The dye showed λ max at 523 nm (in acetone).

COMPARATIVE EXAMPLES 2-1 TO 2-4

Polyester fibers were dyed in the same manner as in Example 2 excepting the use of dyes having the structural formulas shown in Table 2 to obtain clear red dyed fabrics. Table 2 shows the results of evaluation for these dyes as well as that for the dye in Example 2.

TABLE 2

| | Structural formula for dye | Whiteness, alkali discharge printing | Temperature Dependency | Color fastness to sublimation |
|---|---|---|---|---|
| Example 2 | | 5 | 85 | 4-5 |

TABLE 2-continued

| | Structural formula for dye | Whiteness, alkali discharge printing | Temperature Dependency | Color fastness to sublimation |
|---|---|---|---|---|
| Comparative Example 2-1 | NC-C=C(NC)-N=C(N(CH$_2$CH$_2$CN))-N=N-C$_6$H$_3$(CH$_3$)-N(C$_2$H$_4$OCH$_2$CH=CH$_2$)$_2$ | 3 | 60 | 4 |
| Comparative Example 2-2 | NC-C=C(NC)-N=C(N(CH$_2$CH(OH)C$_2$H$_5$))-N=N-C$_6$H$_3$(CH$_3$)-N(C$_2$H$_4$OCH$_2$CH=CH$_2$)$_2$ | 2-3 | 55 | 4 |
| Comparative Example 2-3 | NC-C=C(NC)-N=C(N(C$_2$H$_5$))-N=N-C$_6$H$_3$(CH$_3$)-N(C$_2$H$_4$OCH$_2$CH=CH$_2$)$_2$ | 1 | 70 | 3-4 |
| Comparative Example 2-4 | NC-C=C(NC)-N=C(N(CH$_2$C$_6$H$_5$))-N=N-C$_6$H$_3$(CH$_3$)-N(C$_2$H$_4$OCH$_2$CH=CH$_2$)$_2$ | 1 | 30 | 4-5 |

EXAMPLE 3

Polyester fiber fabrics were dyed in the same manner as in Example 1 excepting the use of 30 g of the dye represented by the following structural formula:

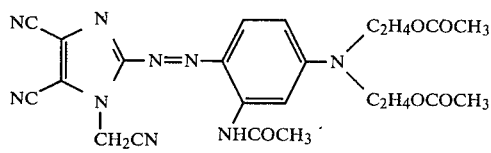

instead of 30 g of the dye in Example 1. As the result, clear blue-tinted printing was obtained having very satisfactory color fastnesses, in particular, excellent color fastnesses to light, sublimation, water and washing, and having very satisfactory white ground printing with distinct contours at the areas where the discharge printing paste had been printed.

The dye used in this example was prepared as below.

A mixture of 46.6 g of the compound represented by the following formula:

8.0 g of sodium hydrogen carbonate and 250 ml of acetonitrile was agitated at room temperature for 30 minutes. 24.0 g of chloroacetonitrile and 0.5 g of potassium iodide were added. Temperature was gradually increased and they were agitated at 81° C. for 16 hours. Then, after cooling the reaction solution to room temperature, it was poured into a mixture of 500 ml of methanol and 500 ml of ice and water, agitated at 0°–5° C. for 1 hour and, thereafter, deposited crystals were collected through filtration. They were washed and dried to obtain 47.8 g of dark red crystals of the dye represented by the following formula:

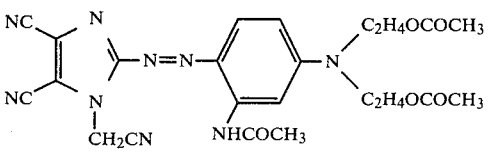

This dye showed λ max at 538 nm (in acetone).

COMPARATIVE EXAMPLES 3-1 TO 3-4

Polyester fibers were dyed in the same manner as in Example 3 excepting the use of dyes having the structural formulas shown in Table 3 to obtain the clear red dyed fabrics. Table 3 shows the results of evaluation for the dyes as well as that for the dye in Example 3.

TABLE 3

| | Structural formula for dye | Whiteness, alkali discharge printing | Temperature dependency | Color fastness to sublimation |
|---|---|---|---|---|
| Example 3 | NC-C(=N)-N(CH₂CN)-C(=N-)-N=N-C₆H₃(NHCOCH₃)-N(C₂H₄OCOCH₃)₂ | 5 | 80 | 4–5 |
| Comparative Example 3-1 | (same core, N-CH₂CH₂CN) | 3 | 55 | 4 |
| Comparative Example 3-2 | (same core, N-CH₂CHC₂H₅OH) | 2–3 | 45 | 4 |
| Comparative Example 3-3 | (same core, N-C₂H₅) | 1 | 65 | 3–4 |
| Comparative Example 3-4 | (same core, N-CH₂-C₆H₅) | 1 | 30 | 4–5 |

EXAMPLE 4

Polyester fiber fabrics were dyed in the same manner as in Example 1 excepting the use of 30 g of the dye represented by the following structural formula:

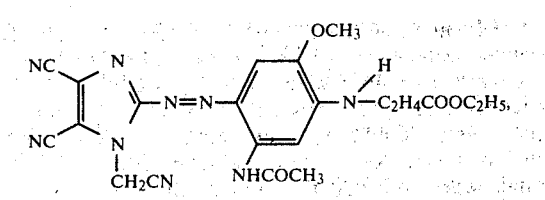

instead of 30 g of the dye in Example 1. As the result, clear purple printing was obtained having very satisfactory color fastnesses, in particular, excellent color fastnesses to light, sublimation, water and washing, and having very satisfactory white ground printing with distinct contours at the areas where the discharge printing paste had been printed.

The dye used in this Example was prepared as below.

A mixture of 42.4 g of the compound represented by the following formula:

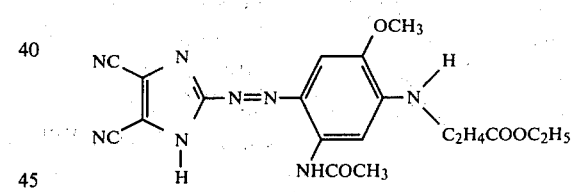

9.0 g of sodium hydrogen carbonate and 300 ml of methylethylketone was agitated at room temperature for 30 minutes. 40.0 g of phenylsulfonic acid cyanomethyl ester were added. They were gradually heated and agitated at 80° C. for 20 hours. Then, after cooling the reaction solution to room temperature, it was poured into a mixture of 500 ml of methanol and 500 ml of ice and water. After 1 hour's agitation at 0°–5° C., deposited crystals were collected through filtration. They were washed and dried to obtain 43.2 g of dark red crystals of the dye represented by the following formula:

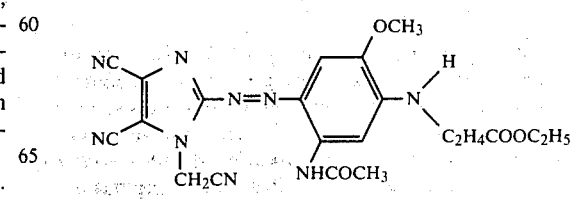

This dye showed λ max at 560 nm (in acetone).

COMPARATIVE EXAMPLES 4-1 TO 4-4

Polyester fibers were dyed in the same manner as in Example 4 excepting the use of dyes having the structural formulas shown in Table 4 to obtain clear blue-tinted red dyed fabrics. Table 4 shows the results of evaluation for the dyes as well as that for the dye in Example 4.

TABLE 4

| | Structural formula for dye | Whiteness, alkali discharge printing | Temperature dependency | Color fastness to sublimation |
|---|---|---|---|---|
| Example 4 | (structure with CH₂CN, NHCOCH₃, OCH₃, C₂H₄COOC₂H₅) | 5 | 90 | 4–5 |
| Comparative Example 4-1 | (structure with CH₂CH₂CN, NHCOCH₃, OCH₃, C₂H₄COOC₂H₅) | 3–4 | 70 | 4 |
| Comparative Example 4-2 | (structure with CH₂CHC₂H₅/OH, NHCOCH₃, OCH₃, C₂H₄COOC₂H₅) | 3 | 60 | 4 |
| Comparative Example 4-3 | (structure with C₂H₅, NHCOCH₃, OCH₃, C₂H₄COOC₂H₅) | 1–2 | 75 | 3 |
| Comparative Example 4-4 | (structure with CH₂–phenyl, NHCOCH₃, OCH₃, C₂H₄COOC₂H₅) | 1 | 50 | 4–5 |

EXAMPLE 5

Polyester fiber fabrics were dyed in the same manner as in Example 1 excepting the use of 25 g of the dye represented by the following structural formula:

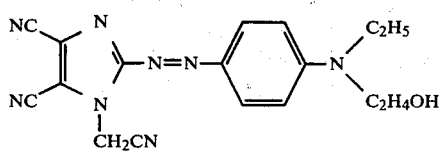

instead of 30 g of the dye in Example 1. As the result, clear red printing having extremely satisfactory color fastnesses, in particular, excellent color fastnesses to light, sublimation water and washing, and having very satisfactory white ground printing with distinct contours at the areas to which the discharge printing paste had been printed was obtained.

The dye used in this Example was prepared as below. To a mixture consisting of 30.9 g of the compound represented by the following formula:

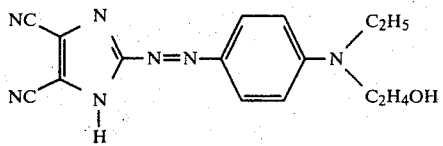

5.3 g of sodium carbonate, 80 ml of tetrahydrofuran and 300 ml of water, were added 17.0 g of iodoacetonitrile. They were gradually heated and agitated at 66° C. for 8 hours. Then, after cooling the reaction solution to room temperature, 300 ml of methanol were added and, after one hour's agitation at room temperature, deposited crystals were collected through filtration. They were washed and dried to obtain 31.7 g of dark red crystals of the dye represented by the following formula:

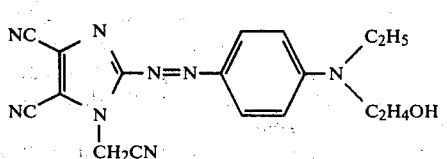

This dye showed λ max at 523 nm (in acetone).

COMPARATIVE EXAMPLES 5-1 TO 5-4

Polyester fibers were dyed in the same manner as in Example 5 excepting the use of dyes having the structural formulas shown in Table 5 to obtain clear yellow-tinted red color dyed fabrics. Table 5 shows the results of evaluation for the dyes as well as that for the dye in Example 5.

TABLE 5

| | Structural formula for dye | Whiteness, alkali discharge printing | Temperature dependency | Color fastness to sublimation |
|---|---|---|---|---|
| Example 5 | (structure with CH$_2$CN) | 5 | 90 | 4–5 |
| Comparative Example 5-1 | (structure with CH$_2$CH$_2$CN) | 3–4 | 70 | 4 |
| Comparative Example 5-2 | (structure with CH$_2$CHC$_2$H$_5$/OH) | 3 | 60 | 4 |
| Comparative Example 5-3 | (structure with C$_2$H$_5$) | 1–2 | 75 | 2–3 |
| Comparative Example 5-4 | (structure with CH$_2$-phenyl) | 1 | 40 | 4–5 |

EXAMPLE 6

Polyester fiber fabrics were dyed in the same manner as in Example 1 excepting the use of 35 g of the dye represented by the following structural formula:

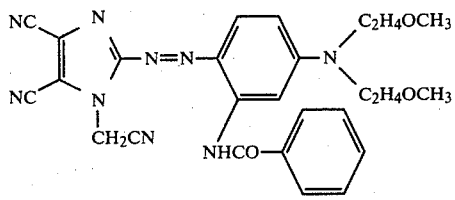

instead of 30 g of the dye in Example 1. As the result, clear blue-tinted red printing having extremely satisfactory color fastness, in particular, excellent color fastnesses to light, sublimation water and washing, and having very satisfactory white ground printing with distinct contours at the areas to which the discharge printing paste had been printed was obtained.

The dye used in this Example was prepared as below:

A mixture consisting of 47.2 g of the compound represented by the following formula:

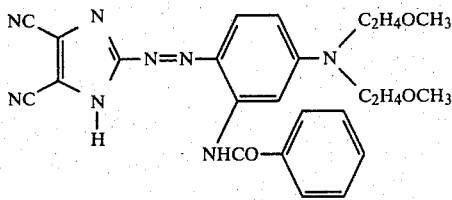

8 g of pyridine, 300 ml of acetonitrile and 24.0 g of chloroacetonitrile was agitated at 81° C. for 20 hours. Then, after cooling the reaction solution to room temperature, it was poured into a mixture of 400 ml of methanol and 700 ml of ice and water, agitated at 0°–5° C. for 1 hours and, thereafter, deposited crystals were collected through filtration. They were washed and dried to obtain 48.3 g of dark red crystals of the dye represented by the following formula:

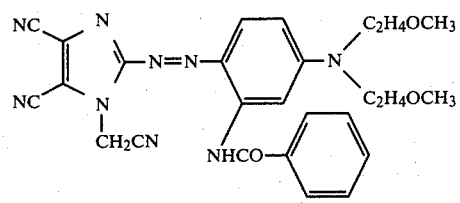

This dye showed λ max at 530 nm (in acetone).

COMPARATIVE EXAMPLE 6-1 TO 6-4

Polyester fibers were dyed in the same manner as in Example 6 excepting the use of dyes having the structural formulas shown in Table 6 to obtain clear red dyed fabrics. Table 6 shows the results of evaluation for these dyes as well as that for the dye in Example 6.

in Table 7, instead of the dye in Example 1. As the result, printings having sharp tone and with very satis-

TABLE 6

| | Structural formula for dye | Whiteness, alkali discharge printing | Temperature dependency | Color fastness to sublimation |
|---|---|---|---|---|
| Example 6 | [structure with NC, N, imidazole, CH₂CN, N=N, NHCO-phenyl, N(C₂H₄OCH₃)₂] | 4 | 75 | 4–5 |
| Comparative Example 6-1 | [structure with CH₂CH₂CN, NHCO-phenyl] | 2–3 | 50 | 4 |
| Comparative Example 6-2 | [structure with CH₂CHC₂H₅/OH, NHCO-phenyl] | 2 | 45 | 4 |
| Comparative Example 6-3 | [structure with C₂H₅, NHCO-phenyl] | 1 | 60 | 3–4 |
| Comparative Example 6-4 | [structure with CH₂-phenyl, NHCO-phenyl] | 1 | 10 | 4–5 |

EXAMPLE 7

Polyester fiber fabrics were dyed in the same manner as in Example 1 excepting the use of the dyes set forth factory quality shown in Table 7 were obtained.

TABLE 7

Structure:
$$\text{NC-C=C(CN)-N(CH}_2\text{CN)-C(=N-)-N=N-C}_6\text{H}_2(\text{R}^3)(\text{R}^4)-\text{N(R}^1)(\text{R}^2)$$

| No. | R¹ | R² | R³ | R⁴ | Dyed tone (polyester fiber) | Dye λ max, nm (in acetone) |
|---|---|---|---|---|---|---|
| 1 | C₄H₉(n) | C₄H₉(n) | H | CH₃ | blue-tinted red | 534 |
| 2 | C₂H₅ | CH₂CHC₄H₉(n) / C₂H₅ | H | CH₃ | blue-tinted red | 531 |
| 3 | CH₃ | CH₃ | H | CH₃ | blue-tinted red | 527 |
| 4 | C₂H₅ | C₂H₅ | H | CH₃ | blue-tinted red | 529 |
| 5 | C₃H₇(n) | C₃H₇(n) | H | CH₃ | blue-tinted red | 532 |
| 6 | C₃H₇(i) | C₃H₇(i) | H | CH₃ | blue-tinted | 531 |

TABLE 7-continued

Structure (header):
NC, N, CN groups on left ring with N-CH₂CN; azo linkage N=N to right ring bearing R³, R⁴ and NR¹R².

| No. | R¹ | R² | R³ | R⁴ | Dyed tone (polyester fiber) | Dye λ max, nm (in acetone) |
|---|---|---|---|---|---|---|
| 7 | $C_4H_9(i)$ | $C_4H_9(i)$ | H | $CH_3$ | red blue-tinted red | 532 |
| 8 | $C_5H_{11}(n)$ | $C_5H_{11}(n)$ | H | $CH_3$ | blue-tinted red | 535 |
| 9 | $C_6H_{13}(n)$ | $C_6H_{13}(n)$ | H | $CH_3$ | blue-tinted red | 535 |
| 10 | $C_7H_{15}(n)$ | $C_7H_{15}(n)$ | H | $CH_3$ | blue-tinted red | 536 |
| 11 | $CH_2CH(C_2H_5)C_4H_9(n)$ | $CH_2CH(C_2H_5)C_4H_9(n)$ | H | $CH_3$ | blue-tinted red | 537 |
| 12 | $C_2H_5$ | $C_4H_9(n)$ | H | $CH_3$ | blue-tinted red | 530 |
| 13 | $C_2H_5$ | $C_5H_{11}(n)$ | H | $CH_3$ | blue-tinted red | 530 |
| 14 | $C_2H_5$ | $C_6H_{13}(n)$ | H | $CH_3$ | blue-tinted red | 530 |
| 15 | $C_2H_5$ | $C_7H_{15}(n)$ | H | $CH_3$ | blue-tinted red | 531 |
| 16 | $C_2H_5$ | $C_8H_{17}(n)$ | H | $CH_3$ | blue-tinted red | 531 |
| 17 | $C_2H_5$ | $CH_2$-C₆H₄-$OCH_3$ | H | $CH_3$ | blue-tinted red | 529 |
| 18 | $C_2H_5$ | $CH_2CH_2CH_2$-C₆H₅ | H | $CH_3$ | blue-tinted red | 531 |
| 19 | $C_4H_9(n)$ | $C_5H_{11}(n)$ | H | $CH_3$ | blue-tinted red | 534 |
| 20 | $C_4H_9(n)$ | $CH_2CH(C_2H_5)C_4H_9(n)$ | H | $CH_3$ | blue-tinted red | 535 |
| 21 | $C_4H_9(n)$ | $CH_2$-C₆H₄-$CH_3$ | H | $CH_3$ | blue-tinted red | 527 |
| 22 | $C_4H_9(n)$ | $CH_2CH_2$-C₆H₅ | H | $CH_3$ | blue-tinted red | 533 |
| 23 | $C_4H_9(n)$ | $CH_2CH_2CH_2$-C₆H₅ | H | $CH_3$ | blue-tinted red | 534 |
| 24 | $C_2H_4OCH_2CH=CH-CH_3$ | $C_2H_4OCH_2CH=CH-CH_3$ | H | $CH_3$ | blue-tinted red | 523 |
| 25 | $C_2H_4OC_4H_9(n)$ | $C_2H_4OC_4H_9(n)$ | H | $CH_3$ | blue-tinted red | 525 |
| 26 | $CH_2$-(tetrahydrofuran-2-yl) | $CH_2$-(tetrahydrofuran-2-yl) | H | $CH_3$ | blue-tinted red | 525 |
| 27 | $CH_2CH=CH_2$ | $CH_2CH=CH_2$ | H | $CH_3$ | blue-tinted red | 529 |
| 28 | $CH_2C(CH_3)=CH_2$ | $CH_2C(CH_3)=CH_2$ | H | $CH_3$ | blue-tinted red | 529 |
| 29 | $CH_2CH=CHCH_3$ | $CH_2CH=CHCH_3$ | H | $CH_3$ | blue-tinted red | 529 |

TABLE 7-continued

Structure:
NC-C=C(CN)-N(CH₂CN)-C(=N-N=)-N= attached to phenyl ring with R³, R⁴ substituents and NR¹R² group

| No. | R¹ | R² | R³ | R⁴ | Dyed tone (polyester fiber) | Dye λ max, nm (in acetone) |
|---|---|---|---|---|---|---|
| 30 | CH₂C(Cl)=CH₂ | CH₂C(Cl)=CH₂ | H | CH₃ | blue-tinted red | 529 |
| 31 | C₂H₄OCH₃ | C₂H₄OCH₃ | H | CH₃ | blue-tinted red | 525 |
| 32 | C₂H₄OC₂H₅ | C₂H₄OC₂H₅ | H | CH₃ | blue-tinted red | 525 |
| 33 | C₂H₄OC₂H₄OCH₃ | C₂H₄OC₂H₄OCH₃ | H | CH₃ | blue-tinted red | 525 |
| 34 | CH₂CH₂CH(CH₃)OCH₃ | CH₂CH₂CH(CH₃)OCH₃ | H | CH₃ | blue-tinted red | 526 |
| 35 | C₂H₄OC₂H₄OC₂H₄OCH₃ | C₂H₄OC₂H₄OC₂H₄OCH₃ | H | CH₃ | blue-tinted red | 524 |
| 36 | C₂H₄O—C₆H₅ | C₂H₄O—C₆H₅ | H | CH₃ | blue-tinted red | 523 |
| 37 | C₂H₄O—C₆H₄—NO₂ | C₂H₄O—C₆H₄—NO₂ | H | CH₃ | red | 522 |
| 38 | C₂H₄OC₂H₄—C₆H₅ | C₂H₄OC₂H₄—C₆H₅ | H | CH₃ | blue-tinted red | 525 |
| 39 | C₂H₄OCH₂—C₆H₅ | C₂H₄OCH₂—C₆H₅ | H | CH₃ | blue-tinted red | 525 |
| 40 | C₂H₄OH | C₂H₄OH | H | CH₃ | blue-tinted red | 529 |
| 41 | CH₂CH₂CH₂OH | CH₂CH₂CH₂OH | H | CH₃ | blue-tinted red | 532 |
| 42 | CH₂CH(OH)CH₃ | CH₂CH(OH)CH₃ | H | CH₃ | blue-tinted red | 530 |
| 43 | CH₂CH(OH)C₂H₅ | CH₂CH(OH)C₂H₅ | H | CH₃ | blue-tinted red | 530 |
| 44 | C₂H₄OCOCH₃ | C₂H₄OCOCH₃ | H | CH₃ | red | 517 |
| 45 | C₂H₄OCOCH₂Cl | C₂H₄OCOCH₂Cl | H | CH₃ | red | 517 |
| 46 | C₂H₄OCOCH₂CH₂Cl | C₂H₄OCOCH₂CH₂Cl | H | CH₃ | red | 517 |
| 47 | CH₂CH(OH)CH₂OCH₃ | CH₂CH(OH)CH₂OCH₃ | H | CH₃ | blue-tinted red | 526 |
| 48 | CH₂CH(OH)CH₂OC₂H₅ | CH₂CH(OH)CH₂OC₂H₅ | H | CH₃ | blue-tinted red | 526 |
| 49 | CH₂CH(OH)CH₂OCH₂CH=CH₂ | CH₂CH(OH)CH₂OCH₂CH=CH₂ | H | CH₃ | blue-tinted red | 526 |
| 50 | CH₂CH(OH)CH₂Cl | CH₂CH(OH)CH₂Cl | H | CH₃ | blue-tinted red | 526 |
| 51 | CH₂CH(OH)—C₆H₅ | CH₂CH(OH)—C₆H₅ | H | CH₃ | blue-tinted red | 529 |
| 52 | C₂H₄OC₂H₄CN | C₂H₄OC₂H₄CN | H | CH₃ | red | 522 |
| 53 | C₂H₄N(succinimido) | C₂H₄N(succinimido) | H | CH₃ | blue-tinted red | 525 |
| 54 | CH₂COOCH₃ | CH₂COOCH₃ | H | CH₃ | red | 510 |
| 55 | C₂H₄COOC₂H₅ | C₂H₄COOC₂H₅ | H | CH₃ | red | 513 |

TABLE 7-continued

Structure: dye with NC groups, N=N azo linkage to phenyl ring with $R^3$, $R^4$, and $NR^1R^2$ substituents; heterocycle with $CH_2CN$.

| No. | $R^1$ | $R^2$ | $R^3$ | $R^4$ | Dyed tone (polyester fiber) | Dye λ max, nm (in acetone) |
|---|---|---|---|---|---|---|
| 56 | $CH_2COOCH_2$–Ph | $CH_2COOCH_2$–Ph | H | $CH_3$ | red | 510 |
| 57 | $CH_2C=CH_2$ / $Br$ | $CH_2C=CH_2$ / $Br$ | H | $CH_3$ | blue-tinted red | 529 |
| 58 | $CH_2C=CH_2$ / Ph | $CH_2C=CH_2$ / Ph | H | $CH_3$ | blue-tinted red | 529 |
| 59 | $C_2H_4OC_3H_7(n)$ | $C_2H_4OC_3H_7(n)$ | H | $CH_3$ | blue-tinted red | 525 |
| 60 | $C_2H_4OC_4H_9(i)$ | $C_2H_4OC_4H_9(i)$ | H | $CH_3$ | blue-tinted red | 525 |
| 61 | $C_2H_4OC_2H_4OC_2H_5$ | $C_2H_4OC_2H_4OC_2H_5$ | H | $CH_3$ | blue-tinted red | 524 |
| 62 | $C_2H_4OC_2H_4OC_3H_7(n)$ | $C_2H_4OC_2H_4OC_3H_7(n)$ | H | $CH_3$ | blue-tinted red | 524 |
| 63 | $C_2H_4OC_2H_4OC_4H_9(n)$ | $C_2H_4OC_2H_4OC_4H_9(n)$ | H | $CH_3$ | blue-tinted red | 524 |
| 64 | $C_2H_4C(CH_3)_2$–$OCH_3$ | $C_2H_4C(CH_3)_2$–$OCH_3$ | H | $CH_3$ | blue-tinted red | 526 |
| 65 | $C_2H_4OC_2H_4OC_2H_4OC_2H_5$ | $C_2H_4OC_2H_4OC_2H_4OC_2H_5$ | H | $CH_3$ | blue-tinted red | 524 |
| 66 | $C_2H_4OC_2H_4OC_2H_4OC_3H_7(n)$ | $C_2H_4OC_2H_4OC_2H_4OC_3H_7(n)$ | H | $CH_3$ | blue-tinted red | 524 |
| 67 | $C_2H_4OC_2H_4OC_2H_4OC_4H_9(n)$ | $C_2H_4OC_2H_4OC_2H_4OC_4H_9(n)$ | H | $CH_3$ | blue-tinted red | 524 |
| 68 | $C_2H_4OCH_2C(CH_3)=CH_2$ | $C_2H_4OCH_2C(CH_3)=CH_2$ | H | $CH_3$ | red | 523 |
| 69 | $CH_2CH(OH)CH_2OC_4H_9(n)$ | $CH_2CH(OH)CH_2OC_4H_9(n)$ | H | $CH_3$ | blue-tinted red | 526 |
| 70 | $CH_2CH(OH)CH_2OCH_2CH=CHCH_3$ | $CH_2CH(OH)CH_2OCH_2CH=CHCH_3$ | H | $CH_3$ | blue-tinted red | 526 |
| 71 | $CH_2COOC_2H_5$ | $CH_2COOC_2H_5$ | H | $CH_3$ | red | 510 |
| 72 | $C_2H_4OCO$–Ph | $C_2H_4OCO$–Ph | H | $NHCO$–Ph | red | 507 |
| 73 | $C_2H_5$ | $CH_2CH_2CH(CH_3)OCH_3$ | H | $CH_3$ | blue-tinted red | 531 |
| 74 | $C_2H_5$ | $C_2H_4OC_2H_4OC_4H_9(n)$ | H | $CH_3$ | blue-tinted red | 528 |
| 75 | $C_2H_5$ | $CH_2$-(tetrahydrofuran-2-yl) | H | $CH_3$ | blue-tinted red | 529 |
| 76 | $C_2H_5$ | $C_2H_4OCO$–Ph | H | $CH_3$ | red | 522 |
| 77 | $C_2H_5$ | $C_2H_4OCOCH_3$ | H | $CH_3$ | red | 523 |
| 78 | $C_2H_5$ | $C_2H_5$ | H | $NHCOOCH_2$–Ph | blue-tinted red | 533 |
| 79 | $C_2H_5$ | $C_2H_5$ | H | $NHCOOC_4H_9(n)$ | blue- | 533 |

TABLE 7-continued

| No. | R¹ | R² | R³ | R⁴ | Dyed tone (polyester fiber) | Dye λ max, nm (in acetone) |
|---|---|---|---|---|---|---|
| 80 | $C_2H_5$ | $C_2H_5$ | H | NHCO—⟨phenyl⟩ | tinted red blue-tinted red | 535 |
| 81 | H | $CH_2$—⟨tetrahydrofuran-2-yl⟩ | H | $CH_3$ | red | 515 |
| 82 | H | $C_2H_4$—⟨phenyl⟩ | H | $CH_3$ | red | 517 |
| 83 | H | $C_2H_5$ | H | $CH_3$ | red | 517 |
| 84 | H | $C_2H_4OCH_2CH_2CH_3$ | H | $CH_3$ | red | 515 |
| 85 | $C_2H_5$ | $C_2H_5$ | H | Cl | red | 520 |
| 86 | $C_2H_5$ | $C_2H_5$ | Cl | H | red | 519 |
| 87 | $C_2H_5$ | $C_2H_5$ | Cl | $NHCOCH_3$ | red | 521 |
| 88 | $C_2H_5$ | $C_2H_5$ | Br | $NHCOCH_3$ | red | 521 |
| 89 | $C_2H_5$ | $C_2H_5$ | Br | Br | red | 520 |
| 90 | $C_2H_5$ | $C_2H_5$ | Br | H | red | 519 |
| 91 | $C_2H_4COOCH_3$ | H | $CH_3$ | $NHCOCH_3$ | blue-tinted red | 528 |
| 92 | $C_2H_4COOCH_3$ | H | $C_2H_5$ | $NHCOCH_3$ | blue-tinted red | 527 |
| 93 | $C_2H_4COOCH_3$ | H | $C_4H_9(n)$ | $NHCOCH_3$ | blue-tinted red | 528 |
| 94 | $C_2H_4COOCH_3$ | H | $CH_2CH=CH_2$ | $NHCOCH_3$ | blue-tinted red | 526 |
| 95 | $C_2H_4COOCH_3$ | H | $OC_2H_5$ | $NHCOCH_3$ | purple | 560 |
| 96 | $C_2H_4COOCH_3$ | H | $OC_2H_4OC_2H_5$ | $NHCOCH_3$ | purple | 560 |
| 97 | $C_2H_4COOCH_3$ | H | $OCH_2$—⟨tetrahydrofuran-2-yl⟩ | $NHCOCH_3$ | purple | 559 |
| 98 | $C_2H_4COOCH_3$ | H | $OC_2H_4OH$ | $NHCOCH_3$ | purple | 559 |
| 99 | $C_2H_4COOCH_3$ | H | $OC_2H_4OCOCH_3$ | $NHCOCH_3$ | purple | 558 |
| 100 | $C_2H_4COOCH_3$ | H | $OC_2H_4Cl$ | $NHCOCH_3$ | purple | 558 |
| 101 | $C_2H_4COOCH_3$ | H | $OC_2H_4CN$ | $NHCOCH_3$ | purple | 557 |
| 102 | $C_2H_4COOCH_3$ | H | $OC_2H_4OC_2H_4OCH_3$ | $NHCOCH_3$ | purple | 560 |
| 103 | $C_2H_4COOCH_3$ | H | $OC_2H_4OCH_3$ | $NHCOCH_3$ | purple | 560 |
| 104 | $C_2H_5$ | $C_2H_5$ | $OCH_3$ | $OCH_3$ | purple | 550 |
| 105 | $C_2H_5$ | $C_2H_5$ | $OC_2H_5$ | $OC_2H_5$ | purple | 550 |
| 106 | $C_2H_5$ | $C_2H_5$ | H | OH | red | 523 |
| 107 | $C_2H_4OCOCH_3$ | $C_2H_4OCOCH_3$ | H | $NHCONHC_2H_5$ | blue-tinted red | 548 |
| 108 | $C_2H_4OCOCH_3$ | $C_2H_4OCOCH_3$ | H | $NHCONHCH_3$ | blue-tinted red | 547 |
| 109 | $C_2H_5$ | $C_2H_5$ | H | $NHSO_2CH_3$ | blue-tinted red | 530 |
| 110 | $C_2H_5$ | $C_2H_5$ | H | $NHSO_2$—⟨phenyl⟩ | blue-tinted red | 525 |
| 111 | $CH_2CHCH_2OCH_3$ \| $OCOCH_3$ | $CH_2CHCH_2OCH_3$ \| $OCOCH_3$ | H | $CH_3$ | red | 520 |

What is claimed is:

1. A mon-azo dye represented by the following general formula:

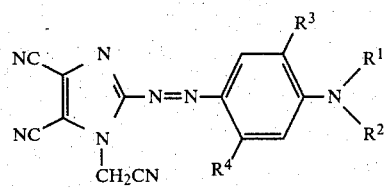

wherein $R^1$ and $R^2$ individually represent hydrogen atom, substituted or non-substituted alkyl group, alkenyl group, and cyclohexyl group, $R^3$ represents hydrogen atom, chlorine atom, bromine atom, alkyl group, substituted or non-substituted alkoxy group or alkenyl group, and $R^4$ represents hydrogen atom, chlorine atom, bromine atom, alkyl group, alkoxy group, hydroxy group, acylamino group, alkoxycarbonylamino group, aralkyloxycarbonylamino group or alkylaminocarbonylamino group.

2. A process for dyeing polyester fibers, in which polyester fibers are dyed by using a mono-azo dye represented by the following general formula:

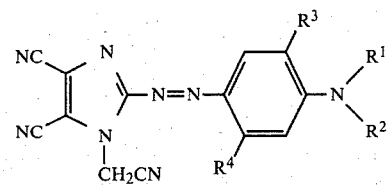

wherein $R^1$ and $R^2$ individually represent hydrogen atom, substituted or non-substituted alkyl group, alkenyl group, and cyclohexyl group, $R^3$ represents hydrogen atom, chlorine atom, bromine atom, alkyl group, substituted or non-substituted alkoxy group or alkenyl group, and $R^4$ represents hydrogen atom, chlorine atom, bromine atom, alkyl group, alkoxy group, hydroxy group, acylamino group, alkoxycarbonylamino group, aralkyloxycarbonylamino group or alkylaminocarbonylamino group.

3. The process as claimed in claim 2, for forming various printing designs to polyester fiber fabrics, in which polyester fibers are applied with discharge or resistive printing by using, as a resistive or discharge printing agent, at least one base selected from the group consisting of hydroxides of alkali metals and alkaline earth metals, salts of weak organic acids and weak inorganic acids, ammonia and aliphatic amines.

* * * * *